(12) United States Patent
Wilhelmsson

(10) Patent No.: US 6,901,120 B2
(45) Date of Patent: May 31, 2005

(54) METHOD AND APPARATUS FOR ITERATIVE PARAMETER ESTIMATION

(75) Inventor: Leif Wilhelmsson, Dalby (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 809 days.

(21) Appl. No.: 09/828,228

(22) Filed: Apr. 9, 2001

(65) Prior Publication Data

US 2002/0067782 A1 Jun. 6, 2002

Related U.S. Application Data

(60) Provisional application No. 60/251,402, filed on Dec. 6, 2000.

(51) Int. Cl.[7] ............................. H03D 1/00; H03D 1/04; H04L 27/22; H03K 5/159
(52) U.S. Cl. ...................... 375/342; 375/329; 375/229; 375/346
(58) Field of Search ................... 370/329; 375/340–347, 375/329, 229

(56) References Cited

U.S. PATENT DOCUMENTS 6,137,843 A * 10/2000 Chennakeshu et al. ..... 375/340
6,263,029 B1 * 7/2001 Alard et al. ................. 375/340
6,320,919 B1 * 11/2001 Khayrallah et al. ......... 375/347
6,366,624 B1 * 4/2002 Balachandran et al. ..... 375/341
6,483,821 B1 * 11/2002 Dabak et al. ............... 370/329
6,674,740 B1 * 1/2004 Siala .......................... 370/342

FOREIGN PATENT DOCUMENTS

EP          0 996 261 A2    4/2000
WO          01/22675 A1     3/2001

* cited by examiner

Primary Examiner—Amanda Le
Assistant Examiner—Cicely Ware
(74) Attorney, Agent, or Firm—Potomac Patent Group PLLC

(57) ABSTRACT

Methods and apparatuses for iterative parameter estimation are described. The iterative parameter estimation includes performing a first estimation of a first portion of a signal to obtain first parameters of the portion of the signal, wherein the signal contains no known data symbols. The first portion of the signal is demodulated using the first parameters to recover data symbols. The demodulated first portion of the signal is checked to confirm correct demodulation of the first portion of the signal. A second estimation of the first portion of the signal is performed using the recovered data symbols to obtain second parameters of the first portion of the signal. Then, a second portion of the signal is demodulated using the second parameters when the first portion of the signal is correctly demodulated.

37 Claims, 2 Drawing Sheets

METHOD AND APPARATUS FOR ITERATIVE PARAMETER ESTIMATION

CROSS-REFERENCE TO RELATED APPLICATIONS

The present application claims priority benefit of provisional U.S. Patent Application Ser. No. 60/251,402, filed Dec. 6, 2000, the disclosure of which is incorporated herein by reference in its entirety.

BACKGROUND

The invention relates to digital communications systems. More particularly, the invention relates to techniques for estimating parameters that are useful or required for demodulating data that is sent in packets including a header and a payload without requiring that training sequence or pilot symbols be available for the parameter estimation.

For a digital communication system to operate properly, frequency estimation and timing recovery should be performed. In addition, other parameters such as phase and channel quality may be estimated. Frequency estimation is necessary because the crystal oscillators (XOs), used in transmitters and receivers, have some deviations (or spread) from their nominal frequency. For example, if the spread in each one of the XOs (i.e., both the transmitter XO and the receiver XO) is 20 ppm, and the carrier frequency of the system is 2.45 GHz, such as in the Industrial, Scientific and Medical (ISM) radio frequency band that is used for BLUETOOTH™ wireless systems, then the frequency offset may be as much as 98 kHz (i.e., $2 \cdot 20 \cdot 10^{-6} \cdot 2.45 \cdot 10^9$ Hz). In most applications this is unacceptable. Therefore, it is necessary to counteract the frequency offset. Conventionally, this is accomplished by estimating the frequency offset and then compensating for it. Clearly, if the frequency offset could be exactly estimated, then the frequency offset could be perfectly compensated for. Thus, the system performance would be the same as if there had been no frequency offset at all. However, a perfect estimate of the frequency offset is not possible because there will be some error in the estimation. After compensating for the estimated frequency offset, there will be some residual frequency error that corresponds to the estimation error. The residual frequency error may be on the order of 5 kHz, which may be acceptable in terms of system performance.

The receiver also has to determine when a packet starts (i.e., frame synchronization) and exactly when to make a decision on the received symbols, referred to as symbol synchronization.

In order to ease both the frequency estimation and the timing recovery, a number of known symbols, sometimes referred to as pilot symbols or a training sequence may be sent. FIG. 1 shows a block diagram of a signal that includes a training sequence 100. The signal also contains a frame synchronization word 102, a header 110 and a payload 120. Although the training sequence 100 is shown at the start of the signal, it may be located at other positions within the signal, such as the center of the signal. Additionally, the locations of the frame synchronization word 102, header 110 and payload 120 are not restricted to the specific locations shown. Knowledge of the training sequence 100 facilitates the receivers estimating the above-described parameters. The frame synchronization word 102 is typically significantly shorter (e.g., 16 binary symbols) than either the header 110 (e.g., 112 binary symbols) or the training sequence 100. The frame synchronization word 102 is detected during signal reception to facilitate locating the first symbol of the header 110. Although the frame synchronization word 102 contains known symbols, the number of symbols is insufficient to aid in time and frequency estimation in a data aided manner.

Alternatively, the frequency estimation and the symbol synchronization may be performed on the data directly. Thus, no symbols are wasted because pilot symbols are not used (i.e., the frequency spectrum is more effectively used). FIG. 2 shows a block diagram of a signal that does not include a training sequence or pilot symbols. The signal contains a frame synchronization word 202, a header 210 and a payload 220. As noted above, the locations of the frame synchronization word 202, header 210 and payload 220 are not restricted to the specific locations shown. However, if no pilot symbols are used, then the estimation typically will be worse than estimation that uses pilot symbols. Therefore, the system performance in terms of bit or packet error rate will be worse. Once again, the number of symbols in the frame synchronization word 202 is insufficient to aid in time and frequency estimation in a data aided manner.

In digital communication systems in general, and in wireless communication systems in particular, data is often sent in a packet having a frame synchronization word, a header and a payload. The header contains vital information for the link, such as control signals, the length of the packet and the like. If the header is not received correctly, the entire packet is disregarded and a retransmission of the entire packet is requested. The payload contains the actual user information to be transmitted. If the payload is received in error, a retransmission of that particular payload is requested. However, if the header is correct, the information in the header may be used regardless of errors in the payload. Therefore, an incorrect header is worse than an incorrect payload. Thus, the header is typically better protected, either by using a more powerful Forward Error Correction (FEC) code, or by employing a more robust modulation format. For example, in a BLUETOOTH™ wireless system, the header is always protected by a (3,1) repetition code, whereas the payload might be un-coded.

Since the header is more robust, the accuracy requirement for estimating parameters of the header is typically not as severe as it is for the payload. Therefore, the header often will be correctly demodulated even though parameters, such as frequency offset, timing, and the like, are only coarsely estimated. If pilot symbols are not used, then the header symbols may be used for performing the estimation. Typically, the estimation may be performed by two standard techniques either by using non-data aided estimation or by using decision directed estimation.

In non-data aided estimation, the information carrying part is simply removed. For instance, in the case of M-ary phase shift keying (PSK), this is achieved by multiplying the phase by M. However, this multiplication also enhances the noise. Therefore, the estimator performs worse than a data-aided estimator.

In decision directed estimation, the estimation is done in a decision feedback fashion. First a decision is made, then this decision, which is assumed to be correct, is used to perform the parameter estimation. If the decision is correct, then the parameter estimation will be as good as if the estimation had been data aided. However, the feedback sometimes is erroneous, which will quite drastically degrade the performance. Consequently, if the channel conditions are good (i.e., if the probability for erroneous feedback is very small), then decision directed parameter estimation is feasible. However, if the channel conditions become worse, then an estimator based on the principle of decision directed parameter estimation is not suitable. Since channel conditions often change, particularly in wireless communications, the channel quality cannot be guaranteed to be good.

The prior art systems rely on training sequences or pilot symbols to provide accurate parameter estimation. However, not all systems use training sequences or pilot symbols. Additionally, if the signal has a training sequence or pilot symbols, then the signal has less capacity for the payload. Therefore, a method and apparatus that can provide accurate parameter estimation without training sequences or pilot symbols are needed.

SUMMARY

It should be emphasized that the terms "comprises" and "comprising", when used in this specification, are taken to specify the presence of stated features, integers, steps or components, but the use of these terms does not preclude the presence or addition of one or more other features, integers, steps, components or groups thereof.

The invention provides a method and apparatus for iterative parameter estimation comprising: performing a first estimation of a first portion of a signal to obtain first parameters of the first portion of the signal, wherein the signal contains no known data symbols. The first portion of the signal is demodulated using the first parameters to recover data symbols. The demodulated first portion of the signal is checked to confirm correct demodulation of the first portion of the signal. A second estimation of the first portion of the signal is performed using the correctly recovered data symbols to obtain second parameters of the first portion of the signal. A second portion of the signal is demodulated using the second parameters.

The above features and advantages of the invention will be more apparent and additional features and advantages of the invention will be appreciated from the following detailed description of the invention made with reference to the drawings.

BRIEF DESCRIPTION OF THE DRAWINGS

The invention will now be described with reference to the following figures, in which.

DETAILED DESCRIPTION

Figure 1:
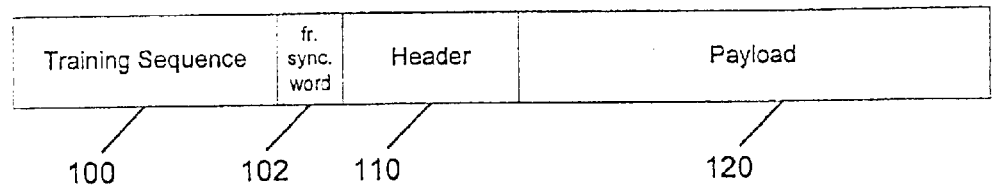
FIG. 1 illustrates a data packet that includes a training sequence.
Figure 2:
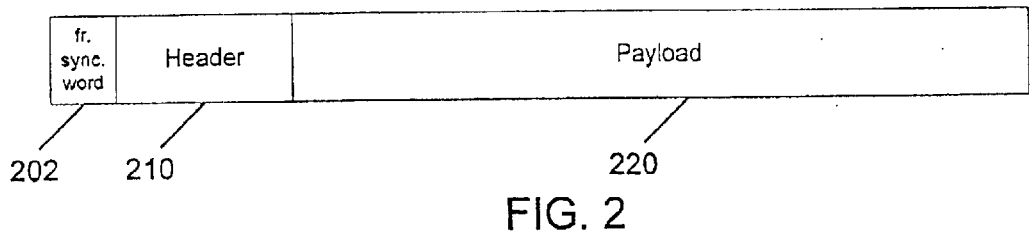
FIG. 2 illustrates a data packet that does not include a training sequence or pilot symbols.

In the following description, for purposes of explanation and not limitation, specific details are set forth, such as particular circuits, circuit components, techniques, and the like in order to provide a thorough understanding of the present invention. However, it will be apparent to one skilled in the art that the present invention may be practiced in other embodiments that depart from these specific details. In other instances, detailed descriptions of well-known methods, devices, and circuits are omitted so as not to obscure the description of the present invention. Before describing specific embodiments of the invention a brief overview of the invention is provided.

In the following description, the frame synchronization word will not be addressed. As previously noted, the frame synchronization word is used only to establish the necessary start position to decode the header and is not useful for data aided estimation. Once the frame synchronization is obtained, the header can be checked for errors by the code used for error detection in a conventional manner. Therefore, the frame synchronization word is not update or part of the iterative parameter estimation, except for its use in the conventional process decoding and checking header for errors.

The invention provides a method and apparatus for iterative parameter estimation that performs as well as data aided estimation, even though the channel conditions are not good. In a first estimation, non-data aided estimation is used for a robustly modulated/coded first portion of the packet. Typically, the first portion used for the first estimation is the header of the data packet. The estimated parameters from the header are used to demodulate the corresponding data symbols in the first portion. The header includes coding for error detection that makes it possible to determine if the demodulation was successful. If the demodulation was successful, then the corresponding data symbols are assumed to be correct.

A second parameter estimation is performed using the data obtained in the first estimation. However, the second estimation may be performed using data aided techniques. This is possible because now there is known data available (i.e., data symbols obtained from the first estimation and demodulation). Since data aided estimation is superior to non-data aided estimation, the second parameter estimation is more accurate. Therefore, the performance of the system is better. Although this improved performance increases the complexity and delay in processing the packet, it is relatively small when compared to the total complexity of processing the packet. In particular, if the number of required retransmissions is reduced, not only is the system performance enhanced but also the total number of computations may be decreased.

As an example, assume that data is transmitted in packets which comprise a header and a payload. Also, assume that M-ary PSK is the modulation used and that the header is binary modulated (i.e., M=2), whereas the payload is transmitted using 8-ary PSK. Therefore, the header is considerably more robust than the payload. Furthermore, assume the header is coded for error detection to minimize the possibility that an incorrect header is accepted. Finally, assume that no pilot symbols or training sequence symbols are included in the packet. Therefore, data aided estimation cannot be employed because no known data symbols are available in the transmitted packet.

During the reception of the header (or possibly only part of the header), the first parameter estimation is performed. This first parameter estimation may be performed by non-data aided (NDA) or decision directed (DD) techniques. The estimated parameters, such as frequency, time, phase, and the like, are then used to demodulate the header. Preferably, the header is encoded for error detection and correction because it carries vital information. Therefore, the probability of accepting an incorrect header should be very small. Upon checking the validity of the header, the header may be correct and accepted, erroneous and rejected, or incorrect but still accepted. The last outcome is not considered because a properly designed system minimizes this possibility. If the header is incorrect, then a retransmission of the complete packet is requested, as is well known in the art.

However, if the header is correctly demodulated, then the symbols in the header are known. Thus, instead of continuing to demodulate the payload using the parameters that were estimated during the reception of the header (i.e., the first estimation), a second estimation is performed using the received header symbols in a data-aided mode. When this second parameter estimation is completed, the demodulation of the payload is performed using the estimated parameters from the data-aided estimation (i.e., second estimation). Since the second estimated parameters are more reliable, the probability that the payload will be correctly demodulated is increased.

Figure 3:
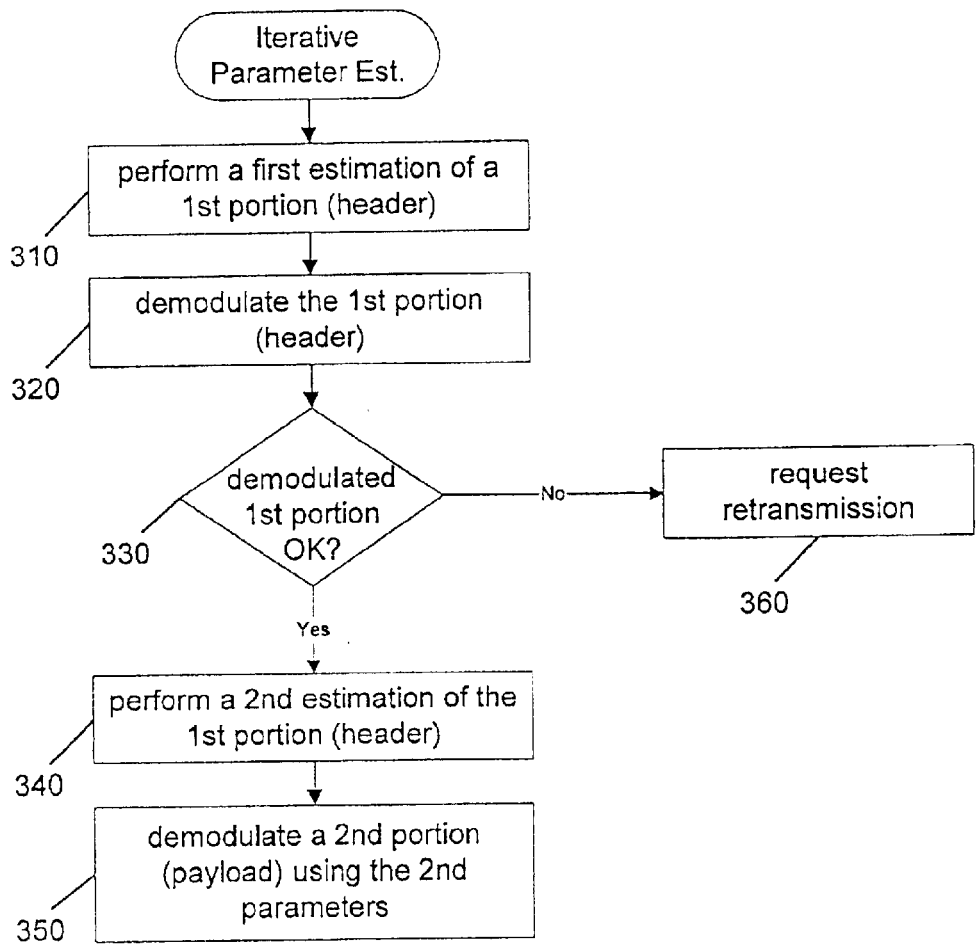
FIG. 3 is a flowchart illustrating an exemplary method of the invention.

Referring to FIG. 3, an exemplary method of iterative parameter estimation is illustrated. In step 310, a first estimation of a first portion (e.g., a header) of a signal is performed to obtain first parameters of the first portion of the signal. The signal contains no known data symbols. In step 320, the first portion of the signal is demodulated using the first parameters to recover data symbols. The demodulated first portion of the signal is checked to confirm correct demodulation of the first portion of the signal, in step 330. In step 340, a second estimation of the first portion of the signal is performed using the correctly recovered data symbols to obtain second parameters of the first portion of the signal. A second portion of the signal is demodulated using the second parameters, in step 350. Optionally, if the demodulated first portion is incorrect, then a retransmission is requested, in step 360. One skilled in the art will appreciate that the first portion may be any robust portion of the signal and that the first portion is not necessarily located at the start of the signal. Additionally, one skilled in the art will appreciate that the invention may be used to improve the network connections in wireless ad-hoc networks (e.g., networks in a BLUETOOTH™ wireless system) and other systems that do not include training sequences or pilot symbols in the transmitted signals.

The first portion of the signal is encoded at least for error detection. However, the second portion may or may not be coded. Further, the first estimation may be performed using non-data aided (NDA) or decision directed (DD) techniques and the second estimation may be performed using data aided estimation techniques. The first and second portions of the signal may be M-ary PSK modulated. To promote more robust transmission, M may equal 2 for the first portion, whereas for the second portion, M may be 2, 4, or 8 (which yields a less robust transmission for the second portion for M=4 or 8).

The first and second parameters may be of the same kind, such as frequency offset, timing, and the like. The second estimate typically will be more accurate, since the second estimation may make use of the data symbols obtained in the first estimation. However, in alternative embodiments, the first and second parameters may be of different kinds. Specifically, the parameters obtained in the second estimation may contain parameters of a type which were not estimated during the first estimation. For example, one of the first or second parameters may be an optimum sampling time that is used in processing the second portion of the signal. Additionally, one of the second parameters may be coefficients used for channel equalization (e.g., the first estimation does not estimate coefficients used for channel equalization). Therefore, the coefficients used for channel equalization are not determined until the first portion of the signal has been demodulated and verified as correct.

Figure 4:
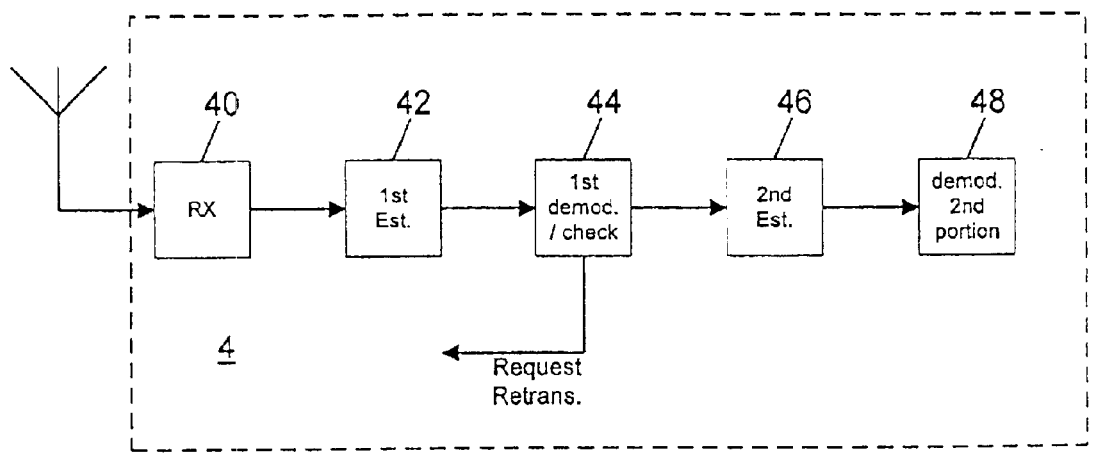
FIG. 4 is a block diagram illustrating an exemplary apparatus of the invention.

FIG. 4 illustrates an apparatus 4 that performs an iterative parameter estimation. The apparatus may be a receiver as illustrated having a receiving circuit 40 that receives and converts a transmitted signal to a signal that may be further processed. However, one skilled in the art will appreciate that the invention is not limited to this specific embodiment. The signal generated by the receiving circuit 40 is provided to block 42 that contains logic that performs a first estimation of a first portion of the signal to obtain first parameters of the first portion of the signal. The signal need not contain any known data symbols. The first parameters and the signal are provided to block 44 that comprises logic that demodulates the first portion of the signal using the first parameters to recover data symbols. Block 44 may further include logic that checks the demodulated first portion of the signal to confirm correct demodulation of the first portion of the signal, although this is not essential to the invention. Block 44 may also contain logic that requests a retransmission of the signal, if the first portion is not demodulated correctly. One skilled in the art will appreciate that retransmission request techniques are well known in the art and the invention is not limited to a specific retransmission request technique. The data symbols and the signal are provided to block 46 that contains logic that performs a second estimation of the first portion of the signal using the correctly recovered data symbols to obtain second parameters of the first portion of the signal. The second parameters and the signal are provided to block 48 that contains logic that demodulates a second portion of the signal using the second parameters.

Figure 5:
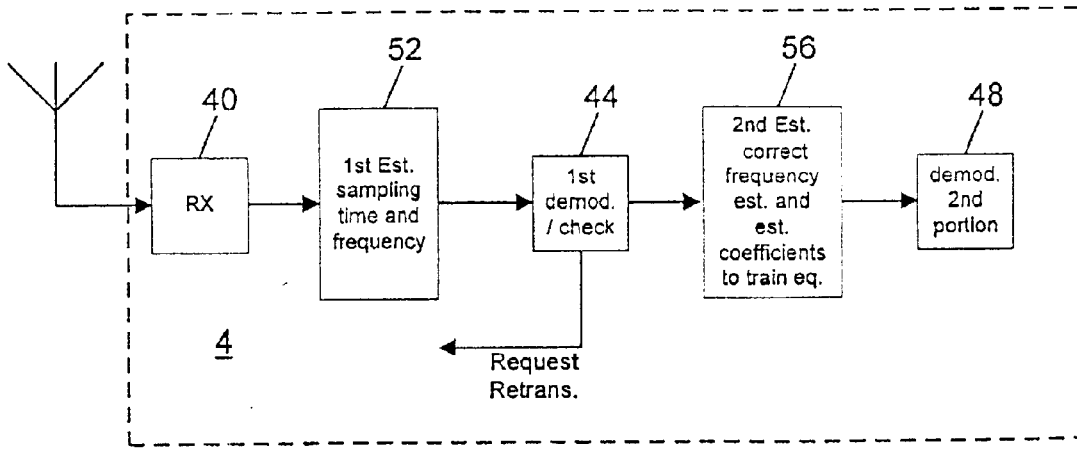
FIG. 5 is a block diagram illustrating a further example of the apparatus of FIG. 4.

Referring to FIG. 5, an example of the receiver 4 is shown. In this example, the first estimation preformed in block 52, includes estimating the sampling time and frequency. The signal is then demodulated and checked in block 44 as described above. Then, in block 56, the second estimation is performed. In the second estimation, the first frequency estimation is further refined to correct any errors in the first estimation. Additionally, an estimation of coefficients is performed to train an equalizer in the second estimation. The second portion is then demodulated, in block 48, using the parameters obtained in the second estimation.

The foregoing has described the principles, preferred embodiments and modes of operation of the invention. However, the invention should not be construed as being limited to the particular embodiments discussed above. For example, the invention is not limited to particular methods or sequences for performing the first and second estimation. For instance, non-data aided estimation of several parameters may be performed in parallel, in series, or jointly. Similarly, the data-aided estimation of several parameters may be performed in parallel, in series, or jointly. Also, any method for the first and second estimation may be used provided the first estimation method is not data aided and the second estimation method is data aided.

Additionally, one skilled in the art will appreciate that the second estimation may be preformed by a decision directed technique. For instance, after the first estimation, the found parameters may be used to reduce the frequency offset. Assuming the original frequency offset was large, then decision directed estimation would not be practical in the first estimation. However, by using the found parameters from the first estimation, the frequency offset may be reduced for the second estimation. Thus, a decision directed estimation may be performed in the second estimation. This decision directed estimation may be performed at the same time as the header is demodulated. Using this method, the second estimation is performed before the header is checked. Once the header is checked, the payload may be immediately processed. Therefore, there is less delay in processing the payload. Because the second estimation is performed even if the header is incorrect, unnecessary calculations may be performed. However, the system performance is not changed in terms of error rate.

Further, the output from the second estimation may be based either on the second estimation only or on both the first and the second estimation, in which case the second estimation may be viewed as a refinement of the first estimation.

The invention has been described in connection with a number of exemplary embodiments. To facilitate an understanding of the invention, many aspects of the invention were described in terms of sequences of actions to be performed by elements of a computer-based system. It will be recognized that in each of the embodiments, the various actions could be performed by specialized circuits (e.g., discrete logic gates interconnected to perform a specialized function), by program instructions being executed by one or more processors, or by a combination of both. Moreover, the invention can additionally be considered to be embodied entirely within any form of a computer readable storage medium having stored therein an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of an embodiment may be referred to herein as "logic configured to" perform a described action, or alternatively as "logic that" performs a described action.

Therefore, the above-described embodiments should be regarded as illustrative rather than restrictive, and it should be appreciated that variations may be made in those embodiments by workers skilled in the art without departing from the scope of the invention as defined by the following claims.

What is claimed is:

1. A method of iterative parameter estimation comprising:
performing a first estimation of a first portion of a signal to obtain first parameters of the first portion of the signal, wherein the signal contains no known data symbols;
demodulating the first portion of the signal using the first parameters to recover data symbols;
checking the demodulated first portion of the signal to confirm correct demodulation of the first portion of the signal;
performing a second estimation of the first portion of the signal using the recovered data symbols to obtain second parameters of the first portion of the signal; and
demodulating a second portion of the signal using the second parameters when the first portion of the signal is correctly demodulated.

2. The method of claim 1, wherein the first portion is a header of the signal.

3. The method of claim 1, wherein the first portion is a robust portion used for parameter estimation of the signal.

4. The method of claim 1, wherein the first portion of the signal is encoded for error correction.

5. The method of claim 4, wherein the second portion of the signal is not coded.

6. The method of claim 4, wherein the second portion is coded.

7. The method of claim 1, wherein the signal is a signal in accordance with Bluetooth wireless technology.

8. The method of claim 1, wherein the second estimation is performed using data aided estimation techniques.

9. The method of claim 1, wherein the first estimation is performed using non-data aided or decision directed techniques.

10. The method of claim 1, wherein the first portion of the signal is binary Phase Shift Keying modulated and wherein the second portion is M-ary Phase Shift Keying modulated, wherein M is 2, 4, or 8.

11. The method of claim 1 further comprising: requesting a retransmission of the signal, if the first portion is not demodulated correctly.

12. The method in claim 1, wherein at least one of the first and second parameters is a frequency offset.

13. The method in claim 1, wherein at least one of the first and second parameters is an optimum sampling time that is used in processing the second portion.

14. The method in claim 1, wherein at least one of the first and second parameters is a set of one or more coefficients used for channel equalization.

15. The method of claim 1, wherein the signal is a signal in a wireless ad-hoc network.

16. The method of claim 1, wherein the first and second parameters are of the same type.

17. The method of claim 1, wherein the second estimation and the demodulation of the first portion are performed at the same time.

18. An apparatus for iterative parameter estimation comprising:
logic that performs a first estimation of a first portion of a signal to obtain first parameters of the first portion of the signal, wherein the signal contains no known data symbols;
logic that demodulates the first portion of the signal using the first parameters to recover data symbols;
logic that checks the demodulated first portion of the signal to confirm correct demodulation of the first portion of the signal;
logic that performs a second estimation of the first portion of the signal using the recovered data symbols to obtain second parameters of the first portion of the signal; and
logic that demodulates a second portion of the signal using the second parameters when the first portion of the signal is correctly demodulated.

19. The apparatus of claim 18, wherein the first portion is a header of the signal.

20. The apparatus of claim 18, wherein the first portion is a robust portion used for parameter estimation of the signal.

21. The apparatus of claim 18, wherein the first portion of the signal is encoded for error correction.

22. The apparatus of claim 21, wherein the second portion of the signal is not coded.

23. The apparatus of claim 21, wherein the second portion of the signal is coded.

24. The apparatus of claim 18, wherein the signal is a signal in accordance with Bluetooth wireless technology.

25. The apparatus of claim 18, wherein the apparatus is a Bluetooth wireless technology device.

26. The apparatus of claim 18, wherein the second estimation is performed using data sided estimation techniques.

27. The apparatus of claim 18, wherein the first estimation is performed using non-date aided or decision directed techniques.

28. The apparatus of claim 18, wherein the first portion the signal is binary Phase Shift Keying modulated and wherein the second portion is M-ary Phase Shift Keying modulated, wherein M is 2, 4, or 8.

29. The apparatus of claim 18 further comprising: logic that requests a retransmission of the signal, if the first portion is not demodulated correctly.

30. The apparatus of claim 18, wherein at least one of the first and second parameters is a frequency offset.

31. The apparatus of claim 18, wherein at least one of the first and second parameters is an optimum sampling time that is used in processing the second portion.

32. The apparatus of claim 18, wherein at least one of the first and second parameters is a set of one or more coefficients used for channel equalization.

33. The apparatus of claim 18, wherein the signal is a signal in a wireless ad-hoc network.

34. The apparatus of claim 18, wherein the first and second parameters are of the same type.

35. The apparatus of claim 18, wherein the second estimation and the demodulation of the first portion are performed at the same time.

36. A method of receiving a signal in a wireless ad-hoc network comprising:

performing a first estimation of a first portion of the signal to obtain first parameters of the first portion of the signal, wherein the signal contains no known data symbols;

demodulating the first portion of the signal using the first parameters to recover data symbols;

checking the demodulated first portion of the signal to confirm correct demodulation of the first portion of the signal;

performing a second estimation of the first portion of the signal using the recovered data symbols to obtain second parameters of the first portion of the signal; and demodulating a second portion of the signal using the second parameters when the first portion of the signal is correctly demodulated.

37. The method of claim 36, wherein the ad-hoc network is a network in a Bluetooth wireless System.

* * * * *